US009443467B2

(12) United States Patent
In et al.

(10) Patent No.: US 9,443,467 B2
(45) Date of Patent: Sep. 13, 2016

(54) DISPLAY PANEL DRIVER, METHOD OF DRIVING DISPLAY PANEL USING THE SAME, AND DISPLAY APPARATUS HAVING THE SAME

(71) Applicant: Samsung Display Co., Ltd., Yongin, Gyeonggi-Do (KR)

(72) Inventors: Hai-Jung In, Yongin (KR); Il-Hun Jeong, Yongin (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 294 days.

(21) Appl. No.: 14/033,122

(22) Filed: Sep. 20, 2013

(65) Prior Publication Data

US 2014/0292826 A1 Oct. 2, 2014

(30) Foreign Application Priority Data

Apr. 2, 2013 (KR) ........................ 10-2013-0035720

(51) Int. Cl.

| | |
|---|---|
| ***G09G 3/32*** | (2006.01) |
| ***G09G 3/36*** | (2006.01) |
| ***G09G 3/29*** | (2006.01) |
| ***G09G 3/20*** | (2006.01) |
| ***G02B 27/22*** | (2006.01) |

(52) U.S. Cl.

CPC .......... *G09G 3/3233* (2013.01); *G09G 3/2022* (2013.01); *G09G 2300/043* (2013.01); *G09G 2300/0842* (2013.01); *G09G 2300/0866* (2013.01); *G09G 2310/0202* (2013.01); *G09G 2330/028* (2013.01)

(58) Field of Classification Search

CPC .............. G09G 2300/0866; G09G 2300/0876

USPC ............. 345/55, 76, 98, 211–213, 522, 690; 349/143

See application file for complete search history.

(56) References Cited

U.S. PATENT DOCUMENTS

| | | | | |
|---|---|---|---|---|
| 8,013,813 | B2 * | 9/2011 | Ono ..................... | G09G 3/3258 315/100 |
| 8,446,345 | B2 | 5/2013 | Yu et al. | |
| 8,446,397 | B2 | 5/2013 | Kimura | |
| 8,471,797 | B2 | 6/2013 | Kim et al. | |
| 8,471,981 | B2 | 6/2013 | Kim et al. | |
| 2002/0093468 | A1 * | 7/2002 | Ouchi .................. | G09G 3/2022 345/55 |
| 2004/0256617 | A1 * | 12/2004 | Yamada ................. | G09G 3/325 257/59 |
| 2007/0120868 | A1 * | 5/2007 | Baek ............................. | 345/600 |
| 2008/0238328 | A1 * | 10/2008 | Shin ..................... | G09G 3/2022 315/169.3 |
| 2008/0284679 | A1 * | 11/2008 | Ishizuka .............. | G09G 3/3233 345/55 |
| 2009/0009504 | A1 * | 1/2009 | Thiebaud ............. | G09G 3/3233 345/212 |
| 2009/0015522 | A1 * | 1/2009 | Ono ..................... | G09G 3/3258 345/76 |
| 2010/0013788 | A1 | 1/2010 | Park et al. | |

(Continued)

FOREIGN PATENT DOCUMENTS

| | | | |
|---|---|---|---|
| KR | 10-2007-0049523 | A | 5/2007 |
| KR | 10-2008-0047922 | A | 5/2008 |
| KR | 10-2011-0045643 | A | 5/2011 |

*Primary Examiner* — Lin Li
(74) *Attorney, Agent, or Firm* — Robert E. Bushnell, Esq.

(57) ABSTRACT

A display apparatus includes a display panel, a gate driver, a data driver and a coupling voltage generator. The display panel includes a plurality of pixels. The gate driver provides a gate signal to the display panel. The data driver provides a data voltage to the display panel. The coupling voltage generator provides a coupling voltage to the display panel. The coupling voltage has a plurality of levels.

16 Claims, 8 Drawing Sheets

(56) References Cited

U.S. PATENT DOCUMENTS

2010/0039406 A1 2/2010 Lee et al.
2010/0045646 A1 2/2010 Kishi
2011/0001735 A1* 1/2011 Okuyama ............ G09G 3/3655 345/204
2011/0141165 A1* 6/2011 Matsui ................. G09G 3/3233 345/690
2011/0234605 A1* 9/2011 Smith ................ G02B 27/2214 345/522
2011/0279435 A1* 11/2011 Tsai ..................... G09G 3/3233 345/212
2012/0001882 A1* 1/2012 Origuchi .............. G09G 3/2927 345/211
2013/0201223 A1* 8/2013 Li ........................ G09G 3/2022 345/690

* cited by examiner

DISPLAY PANEL DRIVER, METHOD OF DRIVING DISPLAY PANEL USING THE SAME, AND DISPLAY APPARATUS HAVING THE SAME

CLAIM OF PRIORITY

This application claims priority under 35 USC §119 to Korean Patent Applications No. 10-2013-0035720, filed on Apr. 2, 2013 in the Korean Intellectual Property Office (KIPO), the contents of which are incorporated herein in its entirety by reference.

BACKGROUND OF THE INVENTION

1. Field of the Invention

The present invention relates generally to a display apparatus. More particularly, the invention relates to a display panel driver, a method of driving a display panel using the display panel driver, and a display apparatus including the display panel driver.

2. Description of the Related Art

Generally, a display apparatus includes a display panel and a display panel driver. The display panel includes a plurality of gate lines, a plurality of data lines and a plurality of pixels. The display panel driver includes a controller, a gate driver and a data driver.

Generally, the pixel includes a switching transistor, a driving transistor, a storage capacitor and an organic light emitting element.

In a digital driving method of the pixel, the driving transistor is operated as a switch not in a saturation region but in a linear region. Accordingly, the driving transistor represents a turn on status or a turn off status.

To turn on or turn off the driving transistor, data voltages having two levels, including a turn on level and a turn off level, are used. In the digital driving method, the pixel represents the turn on status or the off status so that a single frame may be divided into a plurality of subfields so as to represent various grayscales. The turn on status and the turn off status of the pixel during each of the subfields are combined so that the various grayscales of the pixel may be represented.

As a level of grayscales increases, the number of the subfields may increase. Accordingly, the amount of data programming for the pixel increases so that the data driver should be driven at a high speed and emitting time of the display panel may be decreased.

SUMMARY OF THE INVENTION

Some exemplary embodiments of the invention provide a display panel driver capable of decreasing the amount of data programming for the pixel and increasing emitting time of a display panel.

Some exemplary embodiments also provide a method of driving a display panel using the display panel driver.

Some exemplary embodiments still also provide a display apparatus including the display panel driver.

According to some exemplary embodiments, a display apparatus includes a display panel, a gate driver, a data driver and a coupling voltage generator. The display panel includes a plurality of pixels. The gate driver provides a gate signal to the display panel. The data driver provides a data voltage to the display panel. The coupling voltage generator provides a coupling voltage to the display panel. The coupling voltage has a plurality of levels.

In exemplary embodiments, the pixel may comprise: a switching transistor including a control electrode connected to a gate line to which the gate signal is applied, an input electrode connected to a data line to which the data voltage is applied, and an output electrode connected to a first node; a driving transistor including a control electrode connected to the first node, an input electrode to which a high power voltage is applied, and an output electrode connected to a first electrode of an organic light emitting element; and a coupling capacitor including a first end connected to a coupling line to which the coupling voltage is applied and a second end connected to the first node; the organic light emitting element including the first electrode connected to the output electrode of the driving transistor and a second electrode to which a low power voltage is applied.

In exemplary embodiments, a frame may include a plurality of subfields. The subfield may include a plurality of light emitting durations. The coupling voltage may be varied according to the light emitting durations. A voltage at the first node may be varied according to the coupling voltage.

In exemplary embodiments, the coupling voltage may be changed by a first change amount according to the light emitting durations in the subfield.

In exemplary embodiments, the first change amount may be greater than or equal to a voltage gap determining a turn on status and a turn off status of the driving transistor.

In exemplary embodiments, the driving transistor may be a P-type transistor. A level of the coupling voltage during a second light emitting duration may be less than a level of the coupling voltage during a first light emitting duration by the first change amount in the subfield.

In exemplary embodiments, the driving transistor may be an N-type transistor. A level of the coupling voltage during a second light emitting duration may be greater than a level of the coupling voltage during a first light emitting duration by the first change amount in the subfield.

In exemplary embodiments, the subfield may further include an addressing duration during which the data voltages are addressed to the pixels. The addressing duration may be prior to the light emitting durations.

In exemplary embodiments, a difference between the high power voltage and the low power voltage may be less than a threshold voltage to turn on the organic light emitting element during the addressing duration.

In exemplary embodiments, the data voltage may have a value to turn off the driving transistor regardless of grayscales during the addressing duration.

In exemplary embodiments, the coupling voltage may be changed by a second change amount between the addressing duration and the light emitting duration.

In exemplary embodiments, the coupling line may be parallel to the gate line.

According to some exemplary embodiments, a method of driving a display panel comprises providing a gate signal to the display panel including a plurality of pixels, providing a data voltage to the display panel, and providing a coupling voltage to the display panel. The coupling voltage has a plurality of levels.

In exemplary embodiments, the pixel may comprise: a switching transistor including a control electrode connected to a gate line to which the gate signal is applied, an input electrode connected to a data line to which the data voltage is applied, and an output electrode connected to a first node; a driving transistor including a control electrode connected to the first node, an input electrode to which a high power voltage is applied, and an output electrode connected to a first electrode of an organic light emitting element; and a coupling capacitor including a first end to which the coupling voltage is applied and a second end connected to the first node; the organic light emitting element including the first electrode connected to the output electrode of the driving transistor and a second electrode to which a low power voltage is applied.

In exemplary embodiments, a frame may include a plurality of subfields. The subfield may include a plurality of light emitting durations. The coupling voltage may be varied according to the light emitting durations.

In exemplary embodiments, the coupling voltage may be changed by a first change amount according to the light emitting durations in the subfield.

In exemplary embodiments, the first change amount may be greater than or equal to a voltage gap determining a turn on status and a turn off status of the driving transistor.

In exemplary embodiments, the subfield may further include an addressing duration during which the data voltages are addressed to the pixels. The addressing duration may be prior to the light emitting durations.

In exemplary embodiments, a difference between the high power voltage and the low power voltage may be less than a threshold voltage to turn on the organic light emitting element during the addressing duration.

In exemplary embodiments, the data voltage may have a value to turn off the driving transistor regardless of grayscales during the addressing duration.

According to some exemplary embodiments, a display panel driver includes a gate driver, a data driver and a coupling voltage generator. The gate driver provides a gate signal to a display panel, the display panel including a plurality of pixels. The data driver provides a data voltage to the display panel. The coupling voltage generator provides a coupling voltage to the display panel. The coupling voltage has a plurality of levels.

In exemplary embodiments, a frame may include a plurality of subfields. The subfield may include a plurality of light emitting durations. The coupling voltage generator may generate the coupling voltage which is varied according to the light emitting durations.

In exemplary embodiments, the coupling voltage may be changed by a first change amount according to the light emitting durations in the subfield.

In exemplary embodiments, the first change amount may be greater than or equal to a voltage gap determining a turn on status and a turn off status of a driving transistor of the display panel.

With respect to the display panel driver, in the method of driving the display panel using the display panel driver and the display apparatus including the display panel driver, the pixel of the display panel may represent a plurality of bits during a subfield using the coupling voltage having a plurality of levels. Accordingly, more grayscales may be represented in the same time period. Therefore, the amount of data programming for the pixel may be decreased, data programming time may be sufficiently provided, and emitting time of the display panel may be increased.

Effectiveness of the present invention is not limited to the above effectiveness. Effectiveness of the present invention may be clearly understood by those skilled in the art.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
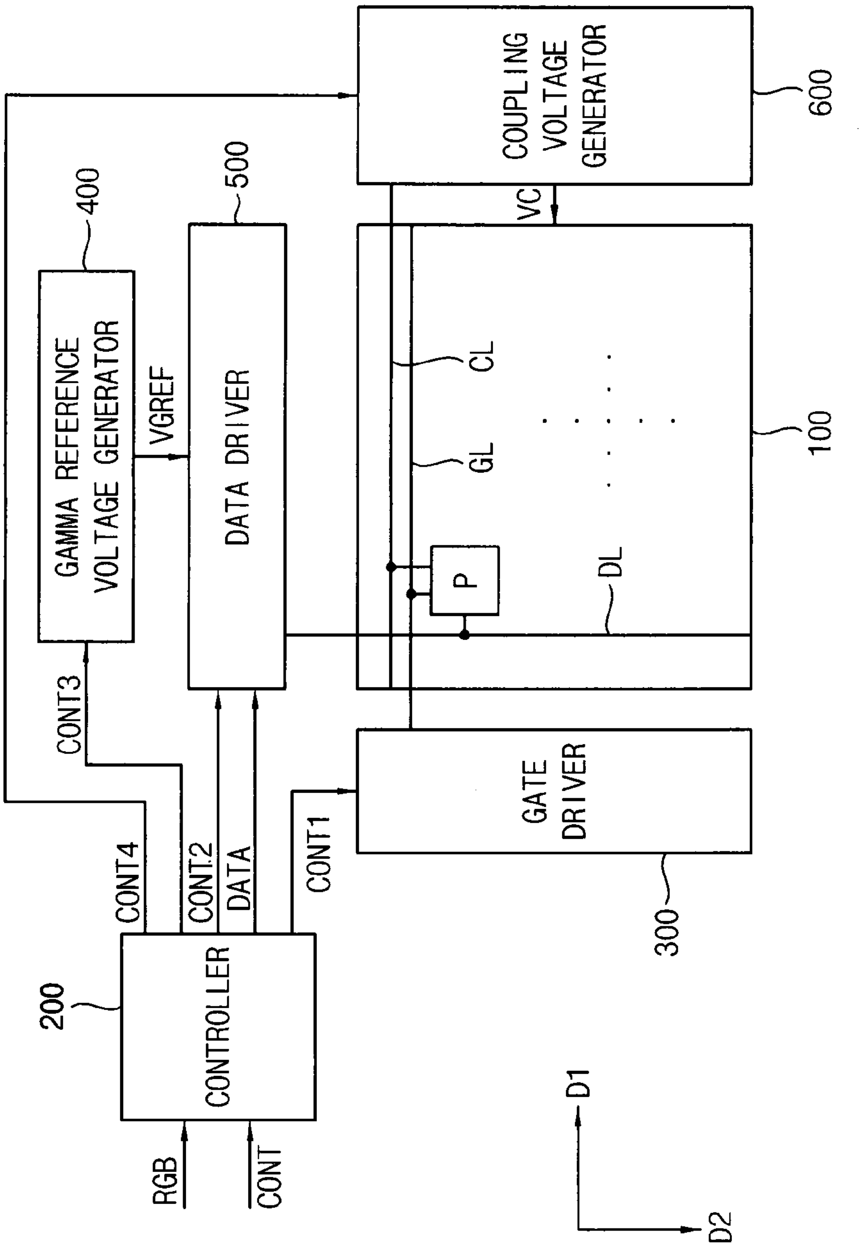
FIG. 1 is a block diagram illustrating a display apparatus according to exemplary embodiments of the invention.

The exemplary embodiments are described more fully hereinafter with reference to the accompanying drawings. The invention may, however, be embodied in many different forms, and should not be construed as being limited to the exemplary embodiments set forth herein. In the drawings, the sizes and relative sizes of layers and regions may be exaggerated for clarity.

It will be understood that, when an element or layer is referred to as being "on," "connected to" or "coupled to" another element or layer, it can be directly on, connected to or coupled to the other element or layer, or intervening elements or layers may be present. In contrast, when an element is referred to as being "directly on," "directly connected to" or "directly coupled to" another element or layer, there are no intervening elements or layers present. Like or similar reference numerals refer to like or similar elements throughout this specification. As used herein, the term "and/or" includes any and all combinations of one or more of the associated listed items.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer, pattern or section from another element, component, region, layer, pattern or section. Thus, a first element, component, region, layer or section discussed below could be termed a second element, component, region, layer or section without departing from the teachings of exemplary embodiments of the invention.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only, and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross sectional illustrations that are schematic illustrations of illustratively idealized exemplary embodiments (and intermediate structures) of the inventive concept. As such, variations from the shapes of the illustrations, as a result, for example, of manufacturing techniques and/or tolerances, are to be expected. Thus, exemplary embodiments should not be construed as limited to the particular shapes of regions illustrated herein, but are to include deviations in shapes that result, for example, from manufacturing. The regions illustrated in the figures are schematic in nature, and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art, and should not be interpreted in an idealized or overly formal sense unless expressly so defined herein.

FIG. 1 is a block diagram illustrating a display apparatus according to exemplary embodiments of the invention.

Referring to FIG. 1, the display apparatus includes a display panel 100 and a display panel driver. The display panel driver includes a controller 200, a gate driver 300, a gamma reference voltage generator 400, a data driver 500 and a coupling voltage generator 600. For example, the display apparatus may be an organic light emitting display apparatus. Alternatively, the display apparatus may be a liquid crystal display apparatus or the display apparatus may be a plasma display apparatus.

The display panel 100 includes a plurality of gate lines GL, a plurality of data lines DL and a plurality of pixels P electrically connected to the gate lines GL and the data lines DL. The display panel 100 may further include a plurality of coupling lines CL connected to the pixels P.

The gate lines GL extend in a first direction D1. The data lines DL extend in a second direction D2 crossing the first direction D1. The coupling lines CL may extend in the first direction D1. For example, the coupling lines CL may extend in a direction parallel with the gate lines GL.

The pixels P may be disposed in a matrix form. A structure of the pixels P may be explained by referring to FIG. 2 in detail.

The controller 200 receives input image data RGB and an input control signal CONT from an external apparatus (not shown). For example, the input image data RGB may include red image data, green image data and blue image data. The input image control signal CONT may include a master clock signal and a data enable signal. The input image control signal CONT may further include a vertical synchronizing signal and a horizontal synchronizing signal.

The controller 200 generates a first control signal CONT1, a second control signal CONT2, a third control signal CONT3, a fourth control signal CONT4 and a data signal DATA based on the input image data RGB and the input control signal CONT.

The controller 200 generates the first control signal CONT1 for controlling an operation of the gate driver 300 based on the input control signal CONT and outputs the first control signal CONT1 to the gate driver 300. The first control signal CONT1 may include a vertical start signal and a gate clock signal.

The controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The controller 200 generates the data signal DATA based on the input image data RGB. The controller 200 outputs the data signal DATA to the data driver 500.

The controller 200 generates the third control signal CONT3 for controlling an operation of the gamma reference voltage generator 400 based on the input control signal CONT, and outputs the third control signal CONT3 to the gamma reference voltage generator 400.

The controller 200 generates the fourth control signal CONT4 for controlling an operation of the coupling voltage generator 600 based on the input control signal CONT, and outputs the fourth control signal CONT4 to the coupling voltage generator 600.

The gate driver 300 generates gate signals to drive the gate lines GL in response to the first control signal CONT1 received from the controller 200. The gate driver 300 sequentially outputs the gate signals to the gate lines GL.

The gate driver 300 may be directly mounted on the display panel 100, or may be connected to the display panel 100 as a tape carrier package ("TCP") type. Alternatively, the gate driver 300 may be integrated on a peripheral region of the display panel 100.

The gamma reference voltage generator 400 generates a gamma reference voltage VGREF in response to the third control signal CONT3 received from the controller 200. The gamma reference voltage generator 400 provides the gamma reference voltage VGREF to the data driver 500. The gamma reference voltage VGREF has a value corresponding to a level of the data signal DATA.

In an exemplary embodiment, the gamma reference voltage generator 400 may be disposed in the controller 200 or in the data driver 500.

The data driver 500 receives the second control signal CONT2 and the data signal DATA from the controller 200, and receives the gamma reference voltages VGREF from the gamma reference voltage generator 400. The data driver 500 converts the data signal DATA into data voltages having an analog form using the gamma reference voltages VGREF. The data driver 500 outputs the data voltages to the data lines DL.

The data driver 500 may include a shift register (not shown), a latch (not shown), a signal processing part (not shown) and a buffer part (not shown). The shift register outputs a latch pulse to the latch. The latch temporally stores the data signal DATA. The latch outputs the data signal DATA to the signal processing part. The signal processing part generates a data voltage having an analog form based on the data signal having a digital form and the gamma reference voltage VGREF. The signal processing part outputs the data voltage to the buffer part. The buffer part compensates the data voltage to have a uniform level. The buffer part outputs the compensated data voltage to the data line DL.

The data driver 500 may be directly mounted on the display panel 100, or may be connected to the display panel 100 in a TCP type. Alternatively, the data driver 500 may be integrated on the peripheral region of the display panel 100.

The coupling voltage generator 600 outputs a coupling voltage VC to the display panel 100 through the coupling lines CL in response to the fourth control signal CONT4 received from the controller 200.

The coupling voltage VC has a plurality of levels. For example, the coupling voltage VC may have temporally varied levels. A waveform of the coupling voltage VC may be explained by referring to FIG. 3 in detail.

Figure 2:
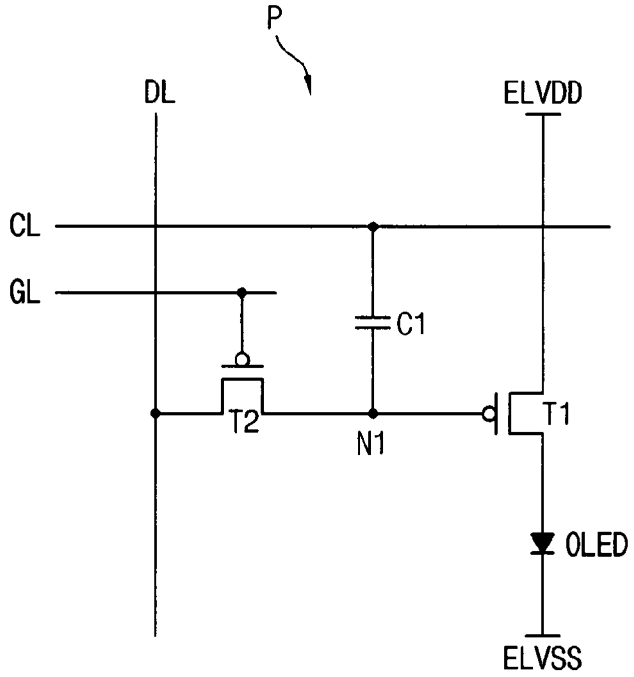
FIG. 2 is a circuit diagram illustrating a pixel of FIG. 1.

FIG. 2 is a circuit diagram illustrating the pixel P of FIG. 1.

Referring to FIGS. 1 and 2, the pixel P includes a switching transistor T2, a driving transistor T1, a coupling capacitor C1 and an organic light emitting element OLED.

The switching transistor T2 includes a control electrode connected to the gate line GL to which the gate signal is applied, an input electrode connected to the data line DL to which the data voltage is applied, and an output electrode connected to a first node N1.

The switching transistor T2 is turned on and turned off in response to the gate signal GL. When the switching transistor T2 is turned on, the data voltage DL is applied to the first node N1.

The control electrode of the switching transistor T2 may be a gate electrode. The input electrode of the switching transistor T2 may be a source electrode. The output electrode of the switching transistor T2 may be a drain electrode.

In the present exemplary embodiment, the switching transistor T2 may be a P-type transistor. The switching transistor T2 may be turned on when the gate signal GL has a low level.

The driving transistor T1 includes a control electrode connected to the first node N1, an input electrode to which a high power voltage ELVDD is applied, and an output electrode connected to a first electrode of the organic light emitting element OLED.

The pixel P is driven in a digital driving method, and the driving transistor T1 is operated in a linear region. Thus, the driving transistor T1 is turned on and turned off in response to a voltage at the first node N1. When the driving transistor T1 is turned on, the high power voltage ELVDD is applied to the first electrode of the organic light emitting element OLED.

The control electrode of the driving transistor T1 may be a gate electrode. The input electrode of the driving transistor T1 may be a source electrode. The output electrode of the driving transistor T1 may be a drain electrode.

In the present exemplary embodiment, the driving transistor T1 may be a P-type transistor. The driving transistor T1 may be turned on when the voltage at the first node N1 is less than a turn on voltage of the driving transistor T1.

The coupling capacitor C1 includes a first end connected to the coupling line CL to which the coupling voltage VC is applied and a second end connected to the first node N1.

When the coupling voltage VC varies, the voltage at the first node N1 varies through the first coupling capacitor C1. For example, when the first node N1 has a first data voltage and the coupling voltage VC applied to the first end of the coupling capacitor C1 decreases from a first coupling voltage to a second coupling voltage, the first data voltage decreases by a difference between the first coupling voltage and the second coupling voltage through the first coupling capacitor C1.

The organic light emitting element OLED includes the first electrode connected to the output electrode of the driving transistor T1 and a second electrode to which a low power voltage ELVSS is applied.

When a difference between a voltage at the first electrode of the organic light emitting element OLED and a voltage at the second electrode thereof is equal to or greater than a threshold voltage, the organic light emitting element OLED is turned on. When the difference between the voltage at the first electrode of the organic light emitting element OLED and the voltage at the second electrode thereof is less than the threshold voltage, the organic light emitting element OLED is turned off.

Figure 3:
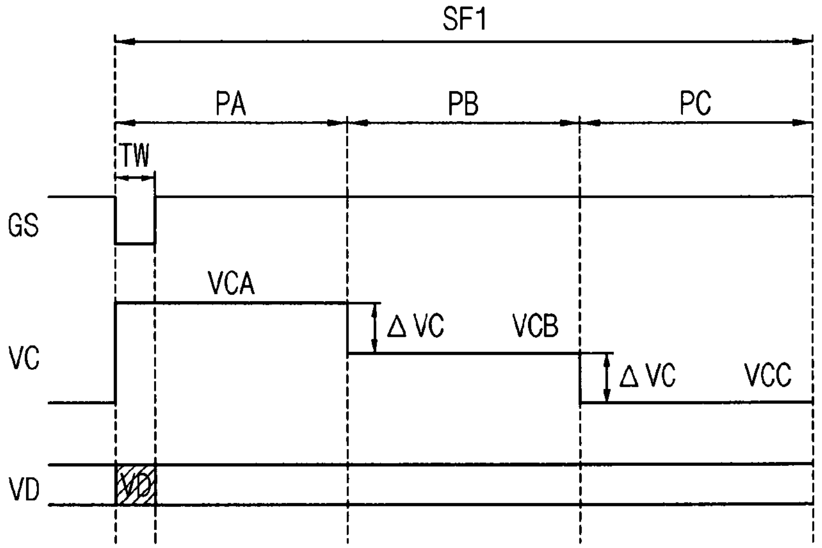
FIG. 3 is a timing diagram illustrating signals applied to the pixel of FIG. 1.

FIG. 3 is a timing diagram illustrating signals applied to the pixel of FIG. 1.

Referring to FIGS. 1 to 3, a frame includes a plurality of subfields. The subfield includes a plurality of light emitting durations. FIG. 3 represents a first subfield SF1. For example, the first subfield SF1 includes first to third light emitting durations PA, PB and PC in FIG. 3. The frame means a time when the display panel 100 displays a frame image.

During a data write duration TW corresponding to an initial time of the first emitting duration PA, the gate signal GS has a low level. When the gate signal GS has a low level, the switching transistor T2 is turned on and the data voltage VD is applied to the first node N1.

During the first emitting duration PA, the coupling voltage VC has a first coupling level VCA.

During the second emitting duration PB, the coupling voltage VC decreases from the first coupling level VCA to a second coupling level VCB. The second coupling level VCB is less than the first coupling level VCA by a first change amount ΔVC. When the coupling voltage VC decreases, the voltage at the first node N1 of FIG. 2 decreases by the first change amount ΔVC through the coupling capacitor C1. For example, the change amount of the voltage at the first node N1 may be less than the change amount ΔVC of the coupling voltage VC due to a parasitic capacitance. However, when the change amount ΔVC of the coupling voltage VC is set to be relatively great, the change amount of the voltage due to the parasitic capacitance may be ignored. Thus, the change amount of the voltage at the first node N1 may be substantially the same as the change amount ΔVC of the coupling voltage VC.

During the third emitting duration PC, the coupling voltage VC decreases from the second coupling level VCB to a third coupling level VCC. The third coupling level VCC is less than the second coupling level VCB by the first change amount ΔVC. When the coupling voltage VC decreases, the voltage at the first node N1 decreases by the first change amount ΔVC through the coupling capacitor C1 of FIG. 2.

The high power voltage ELVDD and the low power voltage ELVSS, which are not shown in FIG. 3, may respectively have direct-current ("DC") voltage values.

Figure 4:
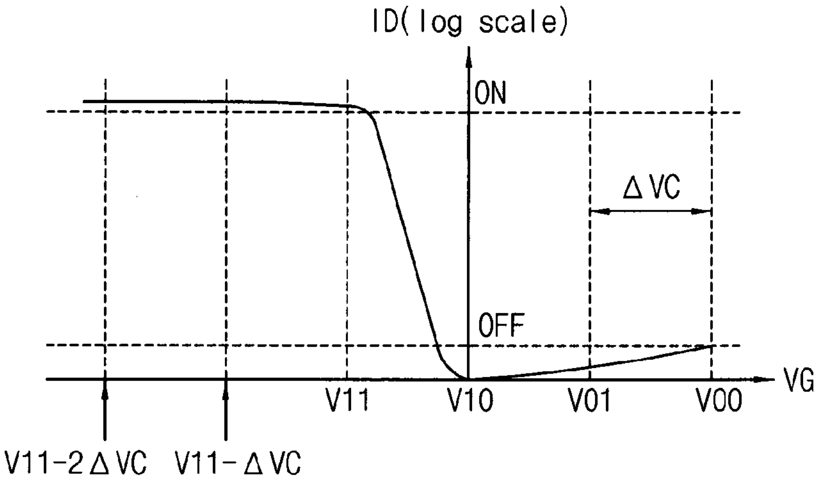
FIG. 4 is a graph illustrating a current passing through a driving transistor of FIG. 2 according to a control voltage of the driving transistor.

FIG. 4 is a graph illustrating a current passing through a driving transistor of FIG. 2 according to a control voltage of the driving transistor. More specifically, FIG. 4 is a graph illustrating a current ID passing through the driving transistor T1 of FIG. 2 according to a control voltage VG of the driving transistor T1.

Referring to FIGS. 1 to 4, the data voltage VD has first to fourth data levels V00, V01, V10 and V11.

The change amount ΔVC of the coupling voltage VC may be equal to or greater than a voltage gap determining a turn on status and a turn off status of the driving transistor T1. In FIG. 4, the voltage gap determining a turn on status and a turn off status of the driving transistor T1 may correspond to a difference between the third data level V10 and the fourth data level V11.

When the data voltage VD has the first data level V00, a control voltage VG of the driving transistor T1 of FIG. 2, which is the voltage at the first node N1, has the first data level V00 during the first light emitting duration PA when the coupling voltage VC has the first coupling level VCA. During the first light emitting duration PA, the driving transistor T1 is turned off.

During the second light emitting duration PB, the coupling voltage VC is decreased to the second coupling level VCB and a control voltage VG of the driving transistor T1 decreases to the second data level V01. During the second light emitting duration PB, the driving transistor T1 is turned off. A difference between the second data level V01 and the first data level V00 is substantially the same as the change amount ΔVC of the coupling voltage VC.

During the third light emitting duration PC, the coupling voltage VC is decreased to the third coupling level VCC and a control voltage VG of the driving transistor T1 decreases to the third data level V10. During the third light emitting duration PC, the driving transistor T1 is turned off.

Therefore, when the data voltage VD has the first data level V00, the driving transistor T1 has a turn off status continuously so that the organic light emitting element OLED does not emit light.

When the data voltage VD has the second data level V01 which is less than the first data level V00 by the change amount ΔVC of the coupling voltage VC, a control voltage VG of the driving transistor T1, which is the voltage at the first node N1, has the second data level V01 during the first light emitting duration PA when the coupling voltage VC has the first coupling level VCA. During the first light emitting duration PA, the driving transistor T1 is turned off.

During the second light emitting duration PB, the coupling voltage VC is decreased to the second coupling level VCB and a control voltage VG of the driving transistor T1 decreases to the third data level V10. During the second light emitting duration PB, the driving transistor T1 is turned off.

During the third light emitting duration PC, the coupling voltage VC is decreased to the third coupling level VCC and a control voltage of the driving transistor T1 decreases to the fourth data level V11. During the third light emitting duration PC, the driving transistor T1 is turned on.

Therefore, when the data voltage VD has the second data level V01, the driving transistor T1 has a turn on status during ⅓ of the first subfield SF1 so that the organic light emitting element OLED emits light during ⅓ of the first subfield SF1.

When the data voltage VD has the third data level V10 which is less than the second data level V01 by the change amount ΔVC of the coupling voltage VC, a control voltage VG of the driving transistor T1, which is the voltage at the first node N1, has the third data level V10 during the first light emitting duration PA when the coupling voltage VC has the first coupling level VCA. During the first light emitting duration PA, the driving transistor T1 is turned off.

During the second light emitting duration PB, the coupling voltage VC is decreased to the second coupling level VCB and a control voltage VG of the driving transistor T1 decreases to the fourth data level V11. During the second light emitting duration PB, the driving transistor T1 is turned on.

During the third light emitting duration PC, the coupling voltage VC is decreased to the third coupling level VCC and a control voltage of the driving transistor T1 decreases to a fifth data level V11−ΔVC. During the third light emitting duration PC, the driving transistor T1 is turned on.

Therefore, when the data voltage VD has the third data level V10, the driving transistor T1 has a turn on status during ⅔ of the first subfield SF1 so that the organic light emitting element OLED emits light during ⅔ of the first subfield SF1.

When the data voltage VD has the fourth data level V11 which is less than the third data level V10 by the change amount ΔVC of the coupling voltage VC, a control voltage VG of the driving transistor T1, which is the voltage at the first node N1, has the fourth data level V11 during the first light emitting duration PA when the coupling voltage VC has the first coupling level VCA. During the first light emitting duration PA, the driving transistor T1 is turned on.

During the second light emitting duration PB, the coupling voltage VC is decreased to the second coupling level VCB and a control voltage VG of the driving transistor T1 decreases to the fifth data level V11−ΔVC. During the second light emitting duration PB, the driving transistor T1 is turned on.

During the third light emitting duration PC, the coupling voltage VC is decreased to the third coupling level VCC and a control voltage of the driving transistor T1 decreases to a sixth data level V11−2ΔVC. During the third light emitting duration PC, the driving transistor T1 is turned on.

Therefore, when the data voltage VD has the fourth data level V11, the driving transistor T1 has a turn on status continuously during the first subfield SF1 so that the organic light emitting element OLED emits light continuously during the first subfield SF1.

Although lengths of the first to third light emitting durations are same as one another in the present exemplary embodiment, the present invention is not limited thereto. Alternatively, lengths of the first to third light emitting durations may be different from one another.

Although the data voltage VD has four data levels in the present exemplary embodiment, the present invention is not limited thereto.

Although the first subfield SF1 has the first to third light emitting durations PA, PB and PC in the present exemplary embodiment, the present invention is not limited thereto.

According to the present exemplary embodiment, a plurality of grayscales may be represented by a single data writing using the varied coupling voltage VC. Accordingly, a data addressing time may be decreased. For example, in a conventional digital driving method, eight data addressings may be used to represent grayscales of eight bits. In contrast, in the present digital driving method, four different levels may be represented in a single data addressing so that four data addressings may be used to represent grayscales of eight bits. Thus, the amount of data programming may be decreased, data programming time may be sufficiently provided and emitting time of the display panel 100 may be increased.

Figure 5:
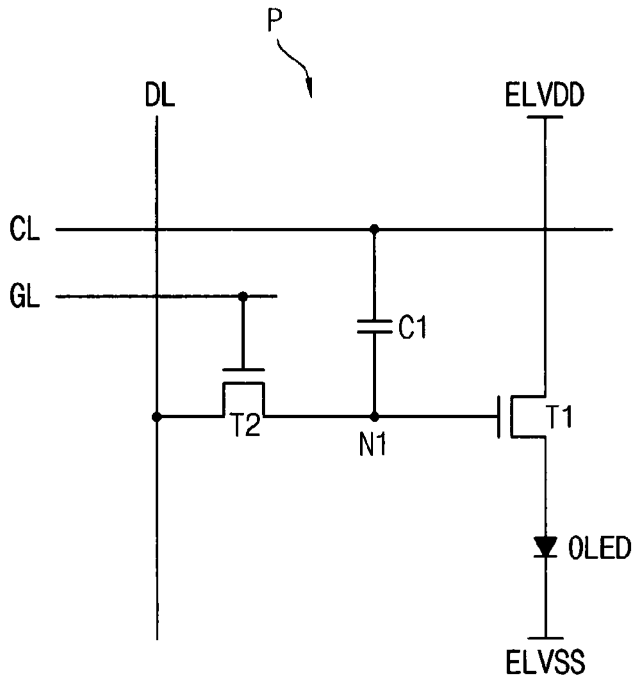
FIG. 5 is a circuit diagram illustrating a pixel according to exemplary embodiments of the invention.
Figure 6:
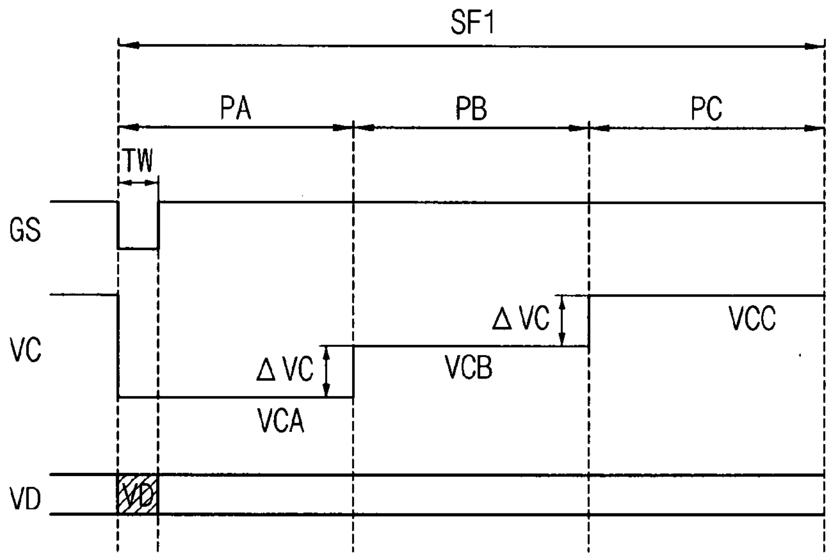
FIG. 6 is a timing diagram illustrating signals applied to the pixel of FIG. 5.

FIG. 5 is a circuit diagram illustrating a pixel according to exemplary embodiments of the invention. FIG. 6 is a timing diagram illustrating signals applied to the pixel of FIG. 5.

The display apparatus and the method of driving the display panel of the present exemplary embodiment are substantially the same as the display apparatus and the method of driving the display panel explained with reference to FIGS. 1 to 4 except for the switching transistor T2 and the driving transistor T1. Thus, the same reference numerals will be used to refer to the same or like parts as those described in the exemplary embodiments of FIGS. 1 to 4 and any repetitive explanation concerning the above elements will be omitted.

Referring to FIGS. 1, 5 and 6, the pixel P includes a switching transistor T2, a driving transistor T1, a coupling capacitor C1 and an organic light emitting element OLED.

The switching transistor T2 includes a control electrode connected to the gate line GL to which the gate signal is applied, an input electrode connected to the data line DL to which the data voltage is applied, and an output electrode connected to a first node N1.

In the present exemplary embodiment, the switching transistor T2 may be an N-type transistor. The switching transistor T2 may be turned on when the gate signal has a high level.

The driving transistor T1 includes a control electrode connected to the first node N1, an input electrode to which a high power voltage ELVDD is applied, and an output electrode connected to a first electrode of the organic light emitting element OLED.

In the present exemplary embodiment, the driving transistor T1 may be an N-type transistor. The driving transistor T1 may be turned on when the voltage at the first node N1 is greater than a turn on voltage of the first driving transistor T1.

The coupling capacitor C1 includes a first end connected to the coupling line CL to which the coupling voltage VC is applied and a second end connected to the first node N1.

The organic light emitting element OLED includes the first electrode connected to the output electrode of the driving transistor T1 and a second electrode to which a low power voltage ELVSS is applied.

A frame includes a plurality of subfields. The subfield includes a plurality of light emitting durations. FIG. 6 represents a first subfield SF1. For example, the first subfield SF1 includes first to third light emitting durations PA, PB and PC in FIG. 6.

During a data write duration TW corresponding to an initial time of the first emitting duration PA, the gate signal GS has a high level. When the gate signal GS has a high level, the switching transistor T2 of FIG. 5 is turned on and the data voltage VD is applied to the first node N1.

During the first emitting duration PA, the coupling voltage VC has a first coupling level VCA.

During the second emitting duration PB, the coupling voltage VC increases from the first coupling level VCA to a second coupling level VCB. The second coupling level VCB is greater than the first coupling level VCA by a first change amount ΔVC. When the coupling voltage VC increases, the voltage at the first node N1 increases by the first change amount ΔVC through the coupling capacitor C1.

During the third emitting duration PC, the coupling voltage VC increases from the second coupling level VCB to a third coupling level VCC. The third coupling level VCC is greater than the second coupling level VCB by the first change amount ΔVC. When the coupling voltage VC increases, the voltage at the first node N1 increases by the first change amount ΔVC through the coupling capacitor C1.

The high power voltage ELVDD and the low power voltage ELVSS, which are not shown in FIG. 6, may respectively have DC voltage values.

According to the present exemplary embodiment, a plurality of grayscales may be represented by a single data writing using the varied coupling voltage VC. Accordingly, a data addressing time may be decreased. Thus, the amount of data programming may be decreased, data programming time may be sufficiently provided, and emitting time of the display panel 100 may be increased.

Figure 7:
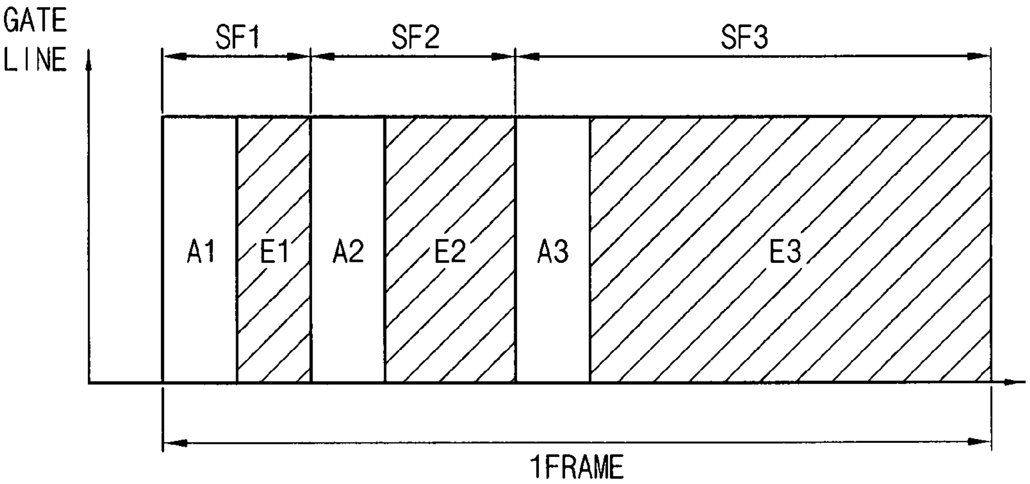
FIG. 7 is a conceptual diagram illustrating a method of driving a display panel according to exemplary embodiments of the invention.
Figure 8:
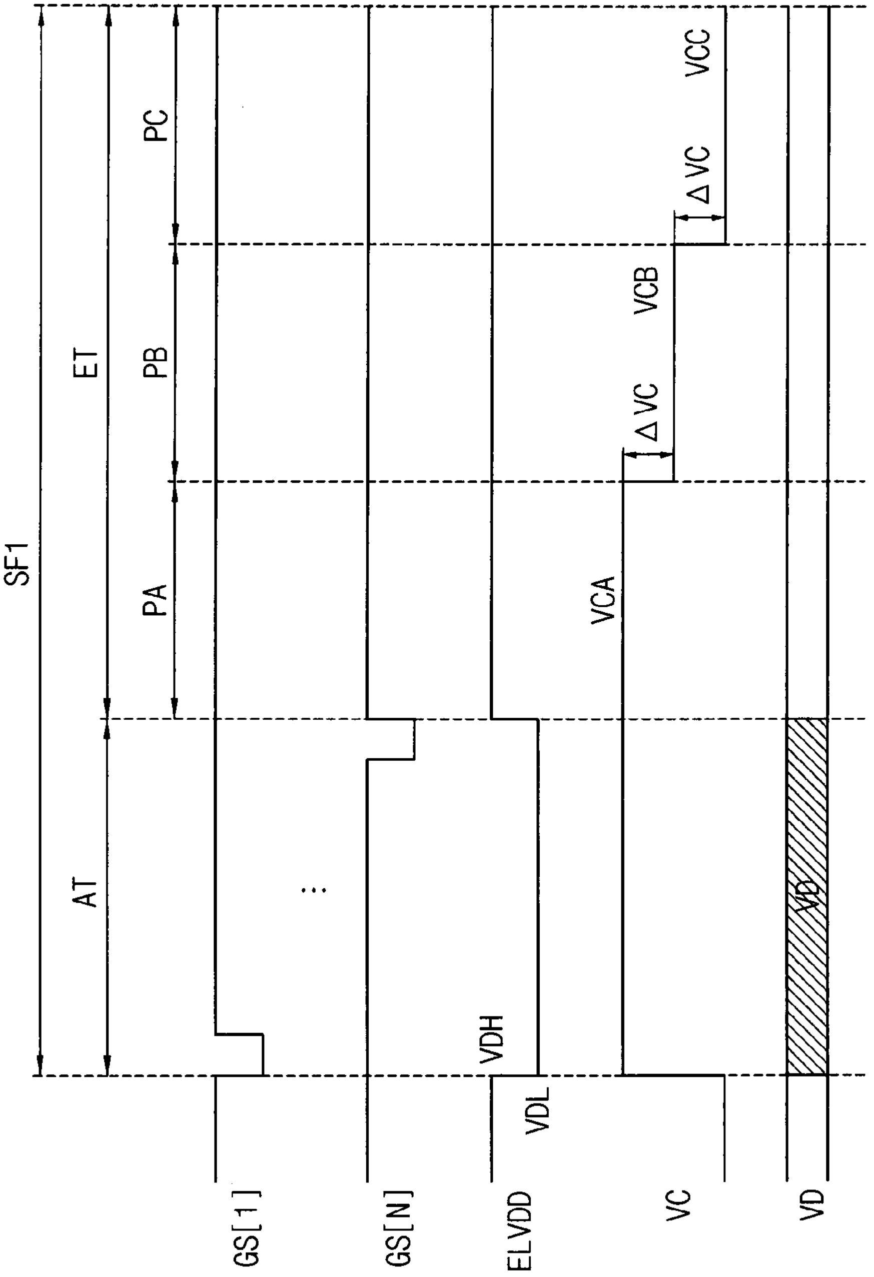
FIG. 8 is a timing diagram illustrating signals applied to a pixel of the display panel of FIG. 7.

FIG. 7 is a conceptual diagram illustrating a method of driving a display panel according to exemplary embodiments of the invention. FIG. 8 is a timing diagram illustrating signals applied to a pixel of the display panel of FIG. 7.

The display apparatus and the method of driving the display panel of the present exemplary embodiment are substantially the same as the display apparatus and the method of driving the display panel explained with reference to FIGS. 1 to 4 except that a subfield is divided into an addressing duration and a light emitting duration. Thus, the same reference numerals will be used to refer to the same or like parts as those described in the exemplary embodiments of FIGS. 1 to 4, and any repetitive explanation concerning the above elements will be omitted.

Referring to FIGS. 1, 2, 7 and 8, a frame 1FRAME includes a plurality of subfields SF1, SF2 and SF3. The subfield includes a plurality of light emitting durations.

FIG. 7 represents the frame 1FRAME. The frame 1FRAME includes first to third subfields SF1, SF2 and SF3. The subfields SF1, SF2 and SF3 include addressing durations A1, A2 and A3, respectively, and light emitting durations E1, E2 and E3, respectively.

FIG. 8 represents the first subfield SF1. The first subfield SF1 includes an addressing duration AT and a light emitting duration ET. The light emitting duration ET includes first to third light emitting durations PA, PB and PC.

During the addressing duration AT, an organic light emitting element OLED of the pixel P does not emit light but the data voltages VD are addressed to the pixels P. During the addressing duration AT, the gate signals GS[1] to GS[N] may be sequentially applied to the pixels P of the display panel 100. For example, the display panel 100 may include N gate lines GL. During the addressing duration AT, the gate signals GS[1] to GS[N] may be sequentially applied to the pixels P of the display panel 100, and the data voltages VD are applied to all of the pixels P line by line.

During the light emitting duration ET, the light emitting element OLED of the pixel P emits light based on the data voltage VD. A method of driving the display panel according to the sequential changes of the coupling voltage VC and the voltage at the first node N1 are substantially the same as the method of driving the display panel explained with reference to FIGS. 3 and 4. Thus, any repetitive explanation concerning the above elements will be omitted.

During the addressing duration AT, the light emitting element OLED of the pixel P does not emit light.

In the present exemplary embodiment, the high power voltage ELVDD has a first level VDH during the light emitting duration ET and a second level VDL less than the first level VDH during the addressing duration AT. The first level VDH is a level to turn on the light emitting element OLED. The second level VDL is a level to turn off the light emitting element OLED.

The low power voltage ELVSS, which is not shown in FIG. 8, may have a DC voltage value.

During the addressing duration AT, a difference between the second level VDL of the high power voltage ELVDD and the low power voltage ELVSS is less than a threshold voltage to turn on the light emitting element OLED. Thus, the high power voltage ELVDD may be adjusted to turn off the light emitting element OLED during the addressing duration AT.

According to the present exemplary embodiment, a plurality of grayscales may be represented by a single data writing using the varied coupling voltage VC. Accordingly, a data addressing time may be decreased. Thus, the amount of data programming may be decreased, data programming time may be sufficiently provided, and emitting time of the display panel 100 may be increased.

Figure 9:
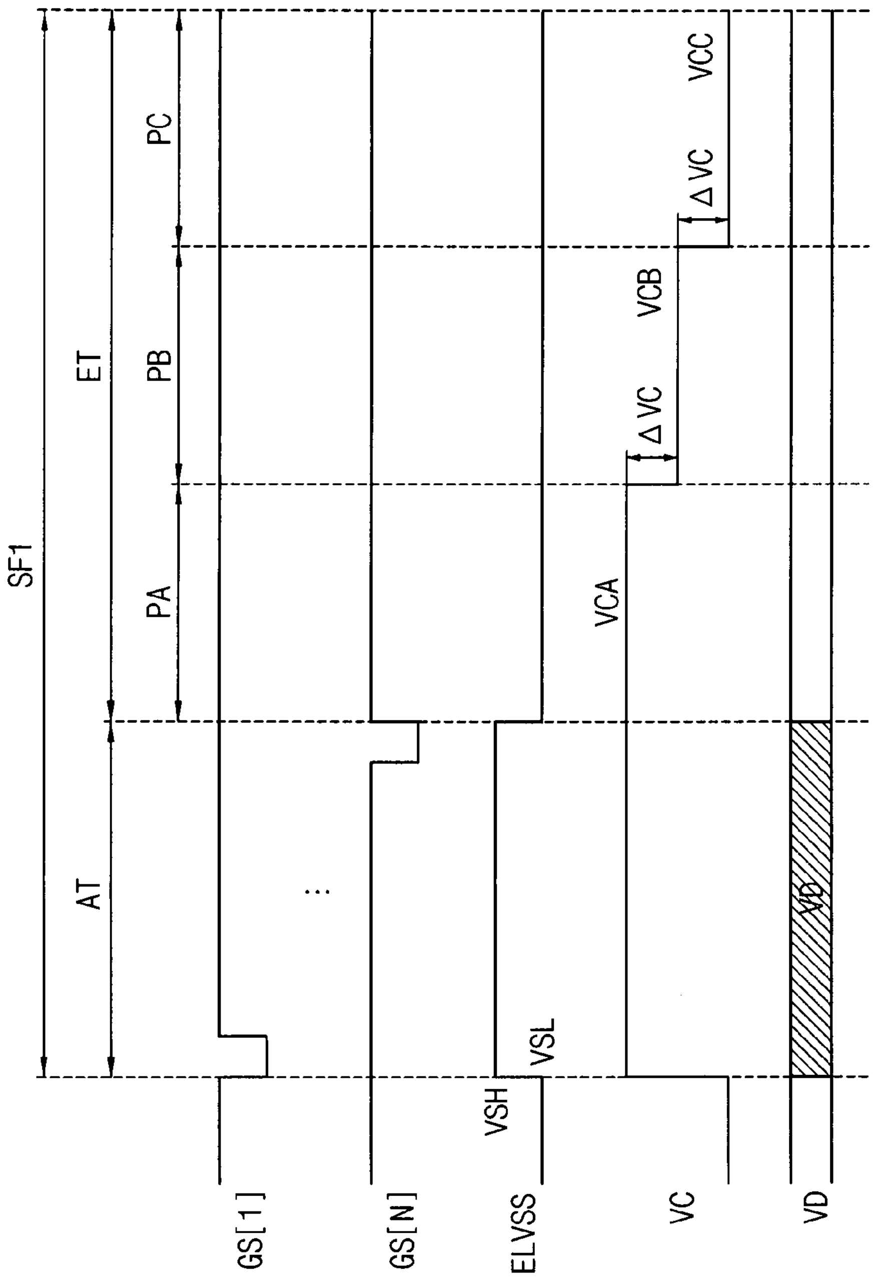
FIG. 9 is a timing diagram illustrating signals applied to a pixel of a display panel according to exemplary embodiments of the invention.

FIG. 9 is a timing diagram illustrating signals applied to a pixel of a display panel according to exemplary embodiments of the invention.

The display apparatus and the method of driving the display panel of the present exemplary embodiment are substantially the same as the display apparatus and the method of driving the display panel explained with reference to FIGS. 7 and 8 except that a low power voltage has first and second levels. Thus, the same reference numerals will be used to refer to the same or like parts as those described in the exemplary embodiments of FIGS. 7 and 8, and any repetitive explanation concerning the above elements will be omitted.

Referring to FIGS. 1, 2, 7 and 9, a frame 1FRAME includes a plurality of subfields SF1, SF2 and SF3. The subfield includes a plurality of light emitting durations.

FIG. 9 represents the first subfield SF1. The first subfield SF1 includes an addressing duration AT and a light emitting duration ET. The light emitting duration ET includes first to third light emitting durations PA, PB and PC.

During the addressing duration AT, an organic light emitting element OLED of the pixel P does not emit light but the data voltages VD are addressed to the pixels P. During the addressing duration AT, the gate signals GS[1] to GS[N] may be sequentially applied to the pixels P of the display panel 100.

During the light emitting duration ET, the light emitting element OLED of the pixel P emits light based on the data voltage VD. A method of driving the display panel according to the sequential changes of the coupling voltage VC and the voltage at the first node N1 are substantially the same as the method of driving the display panel explained with reference to FIGS. 3 and 4. Thus, any repetitive explanation concerning the above elements will be omitted.

During the addressing duration AT, the light emitting element OLED of the pixel P does not emit light.

In the present exemplary embodiment, the low power voltage ELVSS has a first level VSL during the light emitting duration ET and a second level VSH greater than the first level VSL during the addressing duration AT. The first level VSL is a level to turn on the light emitting element OLED. The second level VSH is a level to turn off the light emitting element OLED.

The high power voltage ELVDD, which is not shown in FIG. 9, may have a DC voltage value.

During the addressing duration AT, a difference between the high power voltage ELVDD and the second level VSH of the low power voltage ELVSS is less than a threshold voltage to turn on the light emitting element OLED. Thus, the low power voltage ELVSS may be adjusted to turn off the light emitting element OLED during the addressing duration AT.

According to the present exemplary embodiment, a plurality of grayscales may be represented by a single data writing using the varied coupling voltage VC. Accordingly, a data addressing time may be decreased. Thus, the amount of data programming may be decreased, data programming time may be sufficiently provided and emitting time of the display panel 100 may be increased.

Figure 10:
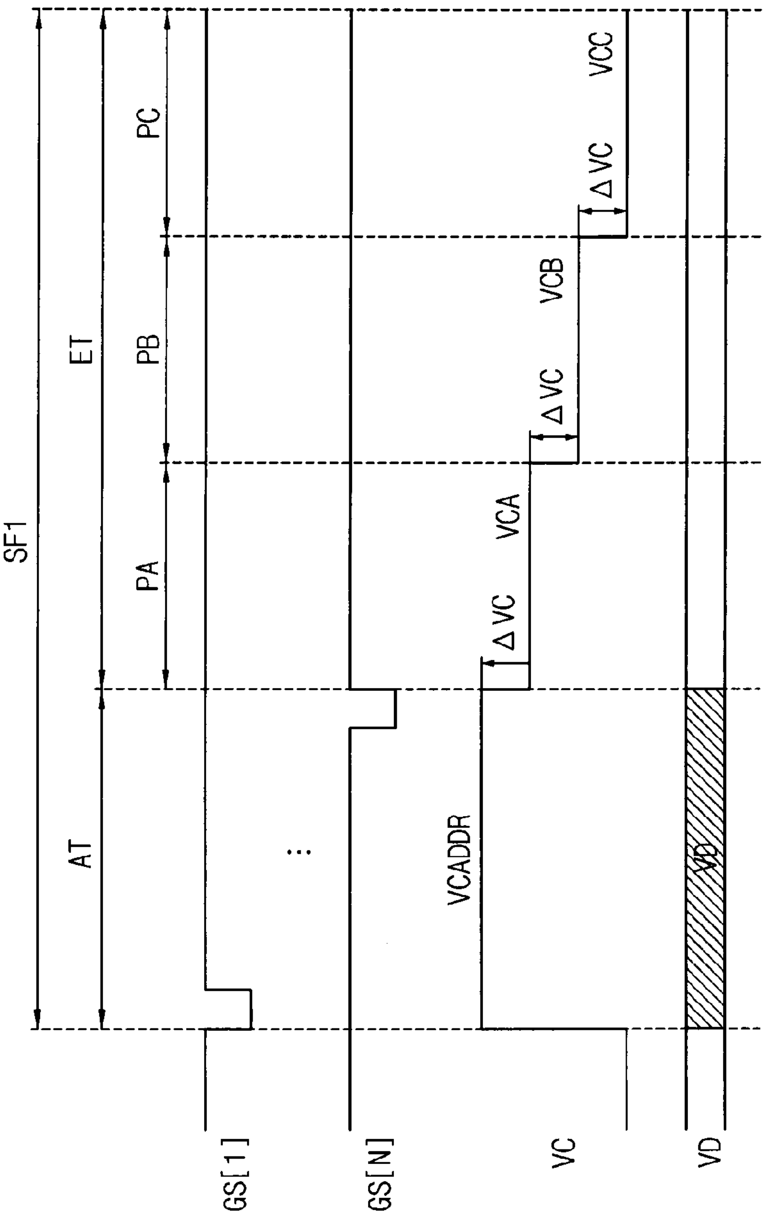
FIG. 10 is a timing diagram illustrating signals applied to a pixel of a display panel according to exemplary embodiments of the invention.

FIG. 10 is a timing diagram illustrating signals applied to a pixel of a display panel according to exemplary embodiments of the invention.

The display apparatus and the method of driving the display panel of the present exemplary embodiment are substantially the same as the display apparatus and the method of driving the display panel explained with reference to FIGS. 7 and 8 except that an organic light emitting element OLED of a pixel P is turned off by a coupling voltage VC during an addressing duration. Thus, the same reference numerals will be used to refer to the same or like parts as those described in the exemplary embodiments of FIGS. 7 and 8, and any repetitive explanation concerning the above elements will be omitted.

Referring to FIGS. 1, 2, 7 and 10, a frame 1FRAME includes a plurality of subfields SF1, SF2 and SF3. The subfield includes a plurality of light emitting durations.

FIG. 10 represents the first subfield SF1. The first subfield SF1 includes an addressing duration AT and a light emitting duration ET. The light emitting duration ET includes first to third light emitting durations PA, PB and PC.

During the addressing duration AT, an organic light emitting element OLED of the pixel P does not emit light but the data voltages VD are addressed to the pixels P. During the addressing duration AT, the gate signals GS[1] to GS[N] may be sequentially applied to the pixels P of the display panel 100.

During the light emitting duration ET, the light emitting element OLED of the pixel P emits light based on the data voltage VD.

During the addressing duration AT, the light emitting element OLED of the pixel P does not emit light.

In the present exemplary embodiment, the coupling voltage VC has an addressing level VCADDR during the light emitting duration ET.

The high power voltage ELVDD and the low power voltage ELVSS, which are not shown in FIG. 10, may respectively have DC voltage values.

Figure 11:
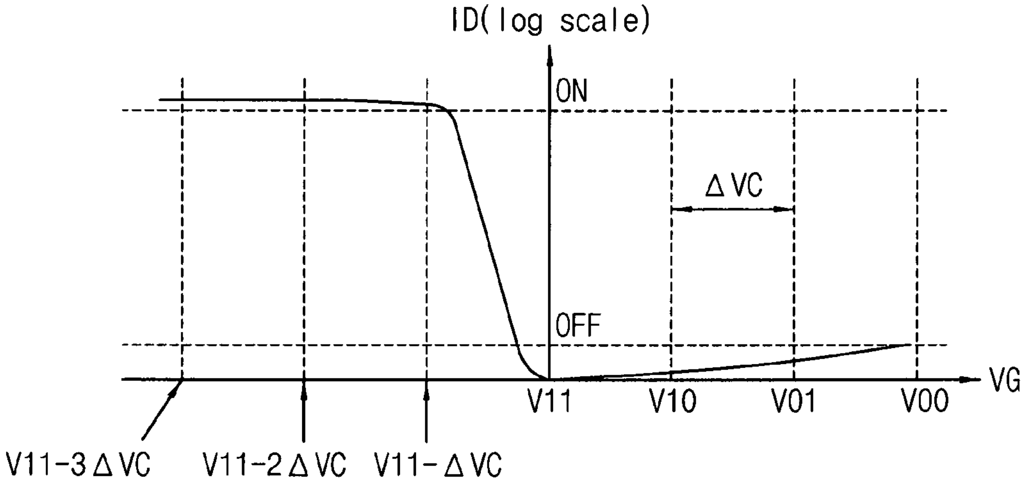
FIG. 11 is a graph illustrating a current passing through a driving transistor of a pixel of FIG. 10 according to a control voltage of the driving transistor.

FIG. 11 is a graph illustrating a current passing through a driving transistor of a pixel of FIG. 10 according to a control voltage of the driving transistor.

Referring to FIGS. 1, 2, 7, 10 and 11, the data voltage VD has first to fourth data levels V00, V01, V10 and V11.

The coupling voltage VC may be changed by a first change amount ΔVC according to the light emitting durations PA, PB and PC in the subfield. The coupling voltage VC may be changed by a second change amount between the addressing duration AT and the light emitting duration ET. For example, the second change amount is the same as the first change amount ΔVC. In the present exemplary embodiment, although the second change amount is the same as the first change amount ΔVC, the present inventive concept is not limited thereto.

The change amount ΔVC of the coupling voltage VC may be equal to or greater than a voltage gap determining a turn on status and a turn off status of the driving transistor T1 of FIG. 2. In FIG. 11, the voltage gap determining a turn on status and a turn off status of the driving transistor T1 may correspond to a difference between the fourth data level V11 and a fifth data level V11−ΔVC which is less than the fourth data level V11 by the change amount ΔVC of the coupling voltage VC.

When the data voltage VD has the first data level V00, a control voltage VG of the driving transistor T1 has the first data level V00 during the addressing duration AT when the coupling voltage VC has the addressing level VCADDR. During the addressing duration AT, the driving transistor T1 is turned off.

During the first light emitting duration PA, the coupling voltage VC is decreased to the first coupling level VCA and a control voltage VG of the driving transistor T1 decreases to the second data level V01. During the first light emitting duration PA, the driving transistor T1 is turned off.

During the second light emitting duration PB, the coupling voltage VC is decreased to the second coupling level VCB and a control voltage VG of the driving transistor T1 decreases to the third data level V10. During the second light emitting duration PB, the driving transistor T1 is turned off.

During the third light emitting duration PC, the coupling voltage VC is decreased to the third coupling level VCC and a control voltage VG of the driving transistor T1 decreases to the fourth data level V11. During the third light emitting duration PC, the driving transistor T1 is turned off.

Therefore, when the data voltage VD has the first data level V00, the driving transistor T1 has a turn off status during the addressing duration AT so that the organic light emitting element OLED does not emit light during the addressing duration AT. In addition, the driving transistor T1 has a turn off status continuously during the light emitting duration ET so that the organic light emitting element OLED does not emit light during the light emitting duration ET.

When the data voltage VD has the second data level V01, a control voltage VG of the driving transistor T1 has the second data level V01 during the addressing duration AT when the coupling voltage VC has the addressing level VCADDR. During the addressing duration AT, the driving transistor T1 is turned off.

During the first light emitting duration PA, the coupling voltage VC is decreased to the first coupling level VCA and a control voltage VG of the driving transistor T1 decreases to the third data level V10. During the first light emitting duration PA, the driving transistor T1 is turned off.

During the second light emitting duration PB, the coupling voltage VC is decreased to the second coupling level VCB and a control voltage VG of the driving transistor T1 decreases to the fourth data level V11. During the second light emitting duration PB, the driving transistor T1 is turned off.

During the third light emitting duration PC, the coupling voltage VC is decreased to the third coupling level VCC and a control voltage VG of the driving transistor T1 decreases to the fifth data level V11−ΔVC. During the third light emitting duration PC, the driving transistor T1 is turned on.

Therefore, when the data voltage VD has the second data level V01, the driving transistor T1 has a turn off status during the addressing duration AT so that the organic light emitting element OLED does not emit light during the addressing duration AT. In addition, the driving transistor T1 has a turn on status during ⅓ of the light emitting duration ET so that the organic light emitting element OLED emits light during ⅓ of the light emitting duration ET.

When the data voltage VD has the third data level V10, a control voltage VG of the driving transistor T1 has the third data level V10 during the addressing duration AT when the coupling voltage VC has the addressing level VCADDR. During the addressing duration AT, the driving transistor T1 is turned off.

During the first light emitting duration PA, the coupling voltage VC is decreased to the first coupling level VCA and a control voltage VG of the driving transistor T1 decreases to the fourth data level V11. During the first light emitting duration PA, the driving transistor T1 is turned off.

During the second light emitting duration PB, the coupling voltage VC is decreased to the second coupling level VCB and a control voltage VG of the driving transistor T1 decreases to the fifth data level V11−ΔVC. During the second light emitting duration PB, the driving transistor T1 is turned on.

During the third light emitting duration PC, the coupling voltage VC is decreased to the third coupling level VCC and a control voltage VG of the driving transistor T1 decreases to a sixth data level V11−2ΔVC. During the third light emitting duration PC, the driving transistor T1 is turned on.

Therefore, when the data voltage VD has the third data level V10, the driving transistor T1 has a turn off status during the addressing duration AT so that the organic light emitting element OLED does not emit light during the addressing duration AT. In addition, the driving transistor T1 has a turn on status during ⅔ of the light emitting duration ET so that the organic light emitting element OLED emits light during ⅔ of the light emitting duration ET.

When the data voltage VD has the fourth data level V11, a control voltage VG of the driving transistor T1 has the fourth data level V11 during the addressing duration AT when the coupling voltage VC has the addressing level VCADDR. During the addressing duration AT, the driving transistor T1 is turned off.

During the first light emitting duration PA, the coupling voltage VC is decreased to the first coupling level VCA and a control voltage VG of the driving transistor T1 decreases to the fifth data level V11−ΔVC. During the first light emitting duration PA, the driving transistor T1 is turned on.

During the second light emitting duration PB, the coupling voltage VC is decreased to the second coupling level VCB and a control voltage VG of the driving transistor T1 decreases to the sixth data level V11−2ΔVC. During the second light emitting duration PB, the driving transistor T1 is turned on.

During the third light emitting duration PC, the coupling voltage VC is decreased to the third coupling level VCC and a control voltage VG of the driving transistor T1 decreases to a seventh data level V11−3ΔVC. During the third light emitting duration PC, the driving transistor T1 is turned on.

Therefore, when the data voltage VD has the fourth data level V11, the driving transistor T1 has a turn off status during the addressing duration AT so that the organic light emitting element OLED does not emit light during the addressing duration AT. In addition, the driving transistor T1 continuously has a turn on status during the light emitting duration ET so that the organic light emitting element OLED emits light during the light emitting duration ET.

During the addressing duration AT, the data voltage VD has a value to turn off the driving transistor T1 regardless of the grayscales. Thus, the organic light emitting element OLED may be turned off during the addressing duration AT. The coupling voltage VC is changed between the addressing duration AT and the light emitting duration ET so that the data voltage VD may represents a desirable grayscale of the pixel P during the light emitting duration ET.

According to the present exemplary embodiment, a plurality of grayscales may be represented by a single data writing using the varied coupling voltage VC. Accordingly, a data addressing time may be decreased. For example, in a conventional digital driving method, eight data addressings may be used to represent grayscales of eight bits. In contrast, in the present digital driving method, four different levels may be represented in a single data addressing so that four data addressing may be used to represent grayscales of eight bits. Thus, the amount of data programming may be decreased, data programming time may be sufficiently provided, and emitting time of the display panel 100 may be increased.

The present inventive concept may be applied to a display panel driver having a coupling voltage generator, the coupling voltage generator generating a coupling voltage having a plurality of levels, a display apparatus including the display panel driver and a display system including the display apparatus. For example, the present inventive concept may be applied to an organic light emitting display apparatus and a liquid crystal display apparatus. As a further example, the present inventive concept may be applied to a cellular phone, a smart phone, a personal digital assistant (PDA), a computer monitor, a laptop, a portable multimedia player (PMP), a television, a digital camera, a MP3 player, a navigation system, a video phone, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A display apparatus, comprising:

a display panel including a plurality of pixels;

a gate driver providing a gate signal to the display panel;

a data driver providing a data voltage to the display panel; and a coupling voltage generator providing a coupling voltage to the display panel, the coupling voltage having a plurality of levels; wherein each pixel comprises:

a switching transistor including a control electrode connected to a gate line to which the gate signal is applied, an input electrode connected to a data line to which the data voltage is applied, and an output electrode connected to a first node;

a driving transistor including a control electrode connected to the first node, an input electrode to which a high power voltage is applied, and an output electrode connected to a first electrode of an organic light emitting element; and a coupling capacitor including a first end connected to a coupling line to which the coupling voltage is applied and a second end connected to the first node; and wherein the organic light emitting element includes the first electrode connected to the output electrode of the driving transistor and a second electrode to which a low power voltage is applied;

wherein a frame includes a plurality of sub fields, each subfield includes at least three light emitting durations, the coupling voltage is varied according to the light emitting durations, and a voltage at the first node is varied according to the coupling voltage; and wherein the coupling voltage has a first voltage level during a first light emitting duration, has a second voltage level different from the first voltage level during a second light emitting duration, and has a third voltage level different from the first voltage level and the second voltage level during a third light emitting duration.

2. The display apparatus of claim 1, wherein the coupling voltage is changed by a first change amount according to the light emitting durations in the subfield.

3. The display apparatus of claim 2, wherein the first change amount is not less than a voltage gap determining a turn on status and a turn off status of the driving transistor.

4. The display apparatus of claim 3, wherein the driving transistor is a P-type transistor, and a level of the coupling voltage during a second light emitting duration is less than a level of the coupling voltage during a first light emitting duration by the first change amount in the subfield.

5. The display apparatus of claim 3, wherein the driving transistor is an N-type transistor, and a level of the coupling voltage during a second light emitting duration is greater than a level of the coupling voltage during a first light emitting duration by the first change amount in the subfield.

6. The display apparatus of claim 1, wherein said each subfield further includes an addressing duration when the data voltages are addressed to the pixels, the addressing duration being prior to the light emitting durations.

7. The display apparatus of claim 6, wherein a difference between the high power voltage and the low power voltage is less than a threshold voltage to turn on the organic light emitting element during the addressing duration.

8. The display apparatus of claim 6, wherein the data voltage has a value to turn off the driving transistor regardless of grayscales during the addressing duration.

9. The display apparatus of claim 8, wherein the coupling voltage is changed by a second change amount between the addressing duration and the light emitting duration.

10. The display apparatus of claim 1, wherein the coupling line is parallel to the gate line.

11. A method of driving a display panel, the method comprising the steps of:

providing a gate signal to the display panel including a plurality of pixels;

providing a data voltage to the display panel; and providing a coupling voltage to the display panel, the coupling voltage having a plurality of levels;

wherein each pixel comprises:

a switching transistor including a control electrode connected to a gate line to which the gate signal is applied, an input electrode connected to a data line to which the data voltage is applied, and an output electrode connected to a first node;

a driving transistor including a control electrode connected to the first node, an input electrode to which a high power voltage is applied, and an output electrode connected to a first electrode of an organic light emitting element; and a coupling capacitor including a first end to which the coupling voltage is applied and a second end connected to the first node; and wherein the organic light emitting element includes the first electrode connected to the output electrode of the driving transistor and a second electrode to which a low power voltage is applied;

wherein a frame includes a plurality of subfields, each subfield includes a plurality of light emitting durations, the coupling voltage is varied according to the light emitting durations, and a voltage at the first node is varied according to the coupling voltage; and wherein the coupling voltage has a first voltage level during a first light emitting duration, has a second voltage level different from the first voltage level during a second light emitting duration, and has a third voltage level different from the first voltage level and the second voltage level during a third light emitting duration.

12. The method of claim 11, wherein the coupling voltage is changed by a first change amount according to the light emitting durations in the subfield.

13. The method of claim 12, wherein the first change amount is not less than a voltage gap determining a turn on status and a turn off status of the driving transistor.

14. The method of claim 11, wherein the subfield further includes an addressing duration when the data voltages are addressed to the pixels, the addressing duration being prior to the light emitting durations.

15. The method of claim 14, wherein a difference between the high power voltage and the low power voltage is less than a threshold voltage to turn on the organic light emitting element during the addressing duration.

16. The method of claim 14, wherein the data voltage has a value for turning off the driving transistor regardless of grayscales during the addressing duration.

* * * * *